United States Patent
Rhoades et al.

(10) Patent No.: US 12,305,075 B2
(45) Date of Patent: May 20, 2025

(54) AQUEOUS FIRE-RETARDANT COMPOSITION AND AQUEOUS COATING COMPOSITION COMPRISING SUCH FIRE-RETARDANT COMPOSITION

(71) Applicant: Akzo Nobel Coatings International B.V., Amsterdam (NL)

(72) Inventors: Toolika Agrawal Rhoades, Amsterdam (NL); Niels Elders, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 345 days.

(21) Appl. No.: 17/777,358

(22) PCT Filed: Nov. 17, 2020

(86) PCT No.: PCT/EP2020/082389
§ 371 (c)(1),
(2) Date: May 17, 2022

(87) PCT Pub. No.: WO2021/099308
PCT Pub. Date: May 27, 2021

(65) Prior Publication Data
US 2022/0411644 A1    Dec. 29, 2022

Related U.S. Application Data

(60) Provisional application No. 62/937,920, filed on Nov. 20, 2019.

(30) Foreign Application Priority Data

Dec. 13, 2019  (EP) .................... 19215919

(51) Int. Cl.
| | |
|---|---|
| C09D 5/18 | (2006.01) |
| C09D 5/02 | (2006.01) |
| C09D 7/20 | (2018.01) |
| C09D 7/65 | (2018.01) |
| C09D 133/06 | (2006.01) |
| C09D 175/08 | (2006.01) |

(52) U.S. Cl.
CPC ............... C09D 5/18 (2013.01); C09D 5/022 (2013.01); C09D 7/20 (2018.01); C09D 7/65 (2018.01); C09D 133/066 (2013.01); C09D 175/08 (2013.01)

(58) Field of Classification Search
CPC . C09D 5/18; C09D 5/022; C09D 7/65; C09D 7/20; C09D 175/08; C09D 133/066
USPC ....................................................... 524/501
See application file for complete search history.

(56) References Cited

U.S. PATENT DOCUMENTS

| | | | |
|---|---|---|---|
| 4,762,751 A | * | 8/1988 | Girgis ..................... B32B 27/12 |
| | | | 428/394 |
| 9,434,884 B2 | | 9/2016 | Lubnin et al. |
| 2003/0088045 A1 | | 5/2003 | Haberle et al. |
| 2011/0313100 A1 | | 12/2011 | Morikami et al. |
| 2015/0353768 A1 | | 12/2015 | Yamada et al. |
| 2016/0215443 A1 | * | 7/2016 | Rapaport ............. C08G 59/308 |
| 2018/0298229 A1 | * | 10/2018 | Wolfovich ........... C08K 3/2279 |

FOREIGN PATENT DOCUMENTS

| | | |
|---|---|---|
| CN | 101137726 | 3/2008 |
| CN | 106752250 | 5/2017 |
| CN | 109913021 | 6/2019 |
| CN | 111154382 | 5/2020 |
| EP | 2832756 A1 | 2/2015 |
| EP | 3243879 A1 * | 11/2017 |
| JP | 2006206835 | 8/2006 |
| JP | 2017186525 A | 10/2017 |
| JP | 201970108 A | 5/2019 |
| KR | 20160099578 | 8/2016 |
| KR | 101804219 B1 | 10/2017 |
| WO | 2015036998 | 3/2015 |
| WO | WO2015/036998 A1 | 3/2015 |
| WO | 2016199145 | 12/2016 |
| WO | WO2016/199145 A1 | 12/2016 |
| WO | WO2015194671 A1 | 6/2017 |

OTHER PUBLICATIONS

English Translation of JPWO2015194671A1.
English Translation of JP2017186525A.
English Translation of JP2019070108A.
English Translation of KR101804219B1.
European Search Report of Corresponding Application No. EP19215919.2, dated Jun. 4, 2020.
International Search Report and Written Opinion of International Application No. PCT/EP2020/082389, mailed Feb. 12, 2021.
"Office Action," from Korean Patent Application No. 10-2022-7009673 mailed Apr. 24, 2024 (4 pages) with English translation.
"Office Action," for Chinese Patent Application No. 202280051748.7 mailed Jul. 11, 2024 (8 pages) with English translation.
"Office Action," for Brazilian Patent Application No. BR112022004434-8 (7 pages) with English translation.

* cited by examiner

Primary Examiner — Tae H Yoon
(74) Attorney, Agent, or Firm — Pauly, DeVries Smith & Deffner LLC

(57) ABSTRACT

The present disclosure relates to an aqueous fire-retardant composition comprising particles dispersed in an aqueous phase, wherein the particles comprise a fire-retardant brominated epoxy polymer and an organic polymer comprising ionic dispersing groups. The present disclosure further relates to an aqueous fire-retardant coating composition comprising such fire-retardant composition, and to a substrate coated with a coating deposited from such coating composition.

14 Claims, No Drawings

AQUEOUS FIRE-RETARDANT COMPOSITION AND AQUEOUS COATING COMPOSITION COMPRISING SUCH FIRE-RETARDANT COMPOSITION

CROSS-REFERENCE TO RELATED APPLICATIONS

This application is a 35 U.S.C. § 371 national phase application of PCT Application No. PCT/EP2020/082389 (published as WO 2021/099308 A1), filed on Nov. 17, 2020, which claims the benefit of priority to U.S. Application No. 62/937,920, filed Nov. 20, 2019 and EP Application Serial No. 19215919.2, filed on Dec. 13, 2019, each of which is incorporated herein by reference in its entirety.

FIELD OF THE INVENTION

The present invention relates to an aqueous fire-retardant composition, to an aqueous fire-retardant coating composition comprising such fire-retardant composition, and to a substrate coated with a coating deposited from such coating composition.

BACKGROUND OF THE INVENTION

Fire-retardant coatings have been developed to control fire by various means, including raising the combustion temperature, reducing the rate of burning, reducing flame propagation, and reducing smoke generation.

For the commercial aircraft industry, aircraft interior components are typically sandwich structures comprising a core structural panel sandwiched between outer skins. Such interior components, like floors, sidewalls, panel coverings, window surrounds, partitions, bulkheads, ceilings, and stowage compartments must withstand fire and emit minimum quantities of smoke and/or other toxic fumes during combustion. The coating thickness for interior cabins of aircrafts typically ranges from 50 to 100 microns due to weight constraints. These weight constraints limit the use of intumescent coatings, since these are effective only at high film thicknesses, typically above 200 microns.

Fire resistance standards in the United States are established by the Federal Aviation Administration. For aircraft interior components, Regulation FAR 25.853 includes flammability requirements for materials used in many aircraft operated in the United States. In particular, FAR 25.853 requires a flame time of the material not to exceed fifteen seconds, a burn length is not to exceed six inches, and a drip flame not to exceed three seconds. Developing effective flame retardant coatings that meet the FAR rate of heat release and have the desired aesthetics for decorative parts has been challenging. It is also desired that coating compositions can be formulated as waterborne compositions.

Bromated epoxy polymers are known as fire retardant and have been proposed for water-borne textiles and for wood coatings. In US 2018/298229 is disclosed an aqueous fire-retardant formulation comprising bromated epoxy polymer that is micronized to an average particle size in the range of about 1 to 10 microns by using milling techniques. The aqueous fire-retardant formulation is used in transparent aqueous wood coatings.

There is a need in the art for aqueous fire-retardant compositions that can be used in aqueous coating compositions in such amounts that the fire-resistance requirements are met, without affecting the mechanical, stain resistance and aesthetic properties of the coating.

SUMMARY OF THE INVENTION

It has now been found that bromated epoxy polymers can be incorporated into aqueous coating compositions in sufficient amounts if provided as an aqueous fire-retardant composition obtainable by first providing an organic liquid phase wherein both the bromated epoxy polymer and an organic polymer with ionic dispersing groups are dissolved, and then emulsifying the organic phase in water. Thus, small particles dispersed in water are obtained. The particles contain the fire retardant (bromated epoxy polymer) and an organic polymer with dispersing groups and the particles are sufficiently small to result, when used in an aqueous coating composition, in a coating with very good aesthetic properties, in particular gloss, even when used in high amounts.

Accordingly, the invention provides in a first aspect an aqueous fire-retardant composition comprising particles dispersed in an aqueous phase, wherein the particles comprise:
a fire-retardant brominated epoxy polymer; and
an organic polymer comprising ionic dispersing groups.

The aqueous fire-retardant composition can suitably be used in an aqueous coating composition, for example as a stir-in, in any suitable amount.

Accordingly, the invention provides in a second aspect an aqueous fire-retardant coating composition comprising the fire-retardant composition according to the first aspect of the invention.

In a third aspect, the invention provides a substrate coated with a coating deposited from a coating composition according to the second aspect of the invention.

DETAILED DESCRIPTION OF THE INVENTION

The fire-retardant composition according to the invention is an aqueous composition comprising particles dispersed in an aqueous phase. The particles comprise a fire-retardant brominated epoxy polymer and an organic polymer with ionic dispersing groups. Both the fire-retardant brominated epoxy polymer and the organic polymer with ionic dispersing groups are present in the same particle.

Bromated epoxy polymers are known as fire retardants (also referred to as flame retardants) and for example disclosed in US 2018/298229. The fire-retardant brominated epoxy polymer in the composition according to the present disclosure preferably is an end-capped bromated epoxy polymer, more preferably a tribromophenol end-capped bromated epoxy polymer, in particular bis(2,4,6-tribromophenyl ether)-terminated tetrabromobisphenol A-epichlorohydrin polymer. The bromated epoxy polymer preferably has a weight average molecular weight in the range of from 700 to 20,000 g/mole, more preferably of from 700 to 3,000 g/mole. Tribromophenol end-capped bromated epoxy polymers are commercially available, for example as TexFRon® 4002 (ex. ICL Industrial Products). The fire-retardant brominated epoxy polymer may be a mixture of two or more fire-retardant brominated epoxy polymers.

Reference herein to molecular weight is to molecular weight as determined by means of gel permeation chromatography (GPC) analysis with tetrahydrofuran (THF) (+0.1% acetic acid) as eluent (1 ml/min) on a styrene-divinylbenzene column combination, using polystyrene standards for calibration.

The organic polymer with ionic dispersing groups may be any suitable organic polymer, preferably a film-forming polymer. Examples of suitable organic polymers are polyacrylate, polyester, polyurethane, polyurea, polyimide, polyamide, or a hybrid of two or more thereof. Preferably, the polymer is a polyacrylate, a polyurethane, or a polyurethane-urea hybrid.

Reference herein to a polyacrylate is to a copolymer obtainable by radical polymerization of acrylate and/or methacrylate monomers, optionally together with other copolymerizable vinyl monomers such as styrene monomers, substituted styrene monomers, or vinyl ethers or esters such as vinyl acetate. Reference herein to acrylate or methacrylate monomers is to monomers with acrylate or methacrylate functionality. Examples of (meth)acrylate monomers are acrylic acid, methacrylic acid, aliphatic and cycloaliphatic esters of acrylic acid or methacrylic acid, and hydroxyalkyl esters of acrylic acid or methacrylic acid.

Ionic dispersing groups are groups that are ionic in water and therewith provide dispersibility in water to the polymer. Ionic dispersing groups are known in the art. Preferably, the ionic dispersing groups are carboxyl groups, sulphonate groups, or phosphonate groups. The ionic dispersing groups are preferably covalently linked to a carbon atom of the polymer. Preferably, the organic polymer has an organic polymer backbone and pendant ionic groups directly or indirectly covalently linked to a carbon atom of the polymer backbone. If the ionic groups are indirectly linked to a carbon atom of the polymer backbone, such group is linked to a carbon atom of the polymer backbone via a divalent organic radical, more preferably a divalent hydrocarbon radical comprising one to six carbon atoms. More preferably, the ionic dispersing groups are carboxyl groups, even more preferably carboxyl groups directly covalently linked to a carbon atom in the polymer backbone.

The organic polymer may have any suitable amount of ionic dispersing groups to provide dispersibility in water. The number of ionic dispersing groups is preferably such that the dispersing polymer has an acid value in the range of 5 to 50 mg KOH/g polymer, more preferably of from 10 to 45 mg KOH/g polymer, even more preferably of from 20 to 40 mg KOH/g polymer. Reference herein to acid value is to the acid value as determined according to ISO 2114.

If the organic polymer with ionic dispersing groups is a polyacrylate, ionic dispersing groups can suitably be incorporated by copolymerizing acidic comonomers such as acrylic acid, methacrylic acid or itaconic acid in the radical polymerization reaction.

If the organic polymer with ionic dispersing groups is a condensation polymer such as for example a polyester, a polyurethane, or a polyurethane-urea hybrid, ionic dispersing groups can suitably be incorporated in the polymer by using, as comonomer in the polycondensation reaction, a polyol or polyamine, preferably a diol or diamine, with a dispersing group. Examples of such comonomers are dimethylolpropionic acid and 2-[(2-aminoethyl)amino] ethanesulphonate. Dimethylolpropionic acid is a particularly preferred comonomer for preparing condensation polymers with ionic dispersing groups.

The aqueous fire-retardant composition according to the invention can suitably be obtained by a process comprising:
a) providing a solution of the fire-retardant polymer and an organic dispersing polymer comprising ionic dispersing groups in organic solvent;
b) neutralizing at least part of the ionic dispersing groups to obtain a neutralized solution of the fire-retardant polymer and the dispersing polymer; and
c) emulsifying the neutralized solution obtained in b) in water to obtain particles comprising the fire-retardant polymer and the dispersing polymer dispersed in an aqueous phase.

In a) a solution of the fire-retardant bromated epoxy polymer and a dispersing polymer comprising ionic dispersing groups in organic solvent is provided. The organic solvent may be any organic solvent or mixture of organic solvents in which both the bromated epoxy polymer and the dispersing polymer dissolve at a temperature at which the neutralized solution is emulsified in c), typically at a temperature in the range 15 to 95° C. Preferably, the organic solvent is an oxygenated organic solvent, such as for example an alcohol, glycol ether, glycol ester, alkyl acetate, ketone, ester, or glycol ether/ester, or a mixture of two or more thereof. More preferably, the solvent comprises a polyalkyleneglycol dialkylether, even more preferably comprises di(propylene glycol)dimethyl ether.

The solution provided in a) may be obtained in any suitable way, for example by dissolving both the fire-retardant bromated epoxy polymer and the dispersing polymer in the same organic solvent, or by first preparing two different solutions, i.e. a solution of the fire-retardant bromated epoxy polymer in a first organic solvent and a solution of the dispersing polymer in a second organic solvent, and then combining the two solutions. The first and second organic solvent may be the same or different. Alternatively, the solution may be provided by preparing the dispersing polymer in the organic solvent and then dissolving the bromated epoxy polymer in the polymer solution. A dispersing polyacrylate may for example be prepared by copolymerizing acrylic monomers including acrylic monomers with ionic groups such as (meth)acrylic acid or itaconic acid in a suitable organic solvent such as for example butyl acetate or methyl ethyl ketone.

In the solution provided in a), both the bromated epoxy polymer and the dispersing polymer are dissolved in the organic solvent. Preferably, the two polymers are not linked to each other with covalent links.

In one embodiment, the dispersing polymer provided in step a) is a polyurethane and the organic solvent is a polyalkyleneoxide dialkylether, more preferably di(propylene glycol)dimethyl ether.

In another embodiment, the dispersing polymer provided in step a) is a polyacrylate and the organic solvent comprises a ketone or ester, for example butyl acetate or methyl ethyl ketone.

For effective emulsification in c), at least part of the ionic dispersing groups in the dispersing polymer are neutralized in b). Preferably at least 50%, more preferably at least 65%, even more preferably at least 90%, still more preferably at least 95%, particularly preferably 100% of the ionic dispersing groups are neutralized before emulsification in c). Neutralization of acidic ionic groups before emulsification is well-known in the art and may be done in any suitable way using common neutralizing agents, for example sodium hydroxide, ammonia, an amine such as diethylamine or triethylamine, an amino alcohol such as dimethyl aminoethanol or diisopropanolamine, or a morpholine or N-alkylmorpholine.

In c), the neutralized solution of fire-retardant polymer and dispersing polymer is emulsified in water to obtain particles comprising the-fire retardant polymer and the dispersing polymer dispersed in an aqueous phase. The particles thus obtained are solid particles or droplets of viscous liquid. Emulsification can be done by any suitable technique known in the art. Typically, water will be added to the neutralized solution of fire-retardant polymer and dispersing polymer under shear conditions until phase inversion occurs. Emulsification can be carried out at any suitable temperature, preferably at a temperature in the range of from 15 to 95° C., more preferably of from 35 to 80° C.

Throughout this specification, the term dispersed particles is used both for dispersed solid particles and for emulsified droplets of liquid that have a defined shape and volume at ambient conditions (293 K, 1 bar (absolute)). The terms emulsion and dispersion and the terms dispersed and emulsified are used herein interchangeably.

The particles obtained in c) are small, typically in the sub-micron range. Preferably, the dispersed particles have a volume average diameter D [4:3] as determined by laser diffraction in the range of from 50 to 500 nm, more preferably of from 100 to 200 nm. The small particle size can also be obtained by other methods known to the person skilled in the art, e.g. by nano-milling or hot-melt extrusion. The skilled person is able to choose the appropriate size of milling beads or extrusion die in order to arrive to the desired particle size.

Optionally, further organic solvent may be added in b) and/or c).

The dispersion obtained in c), optionally after removal of at least part of the organic solvent for example by evaporation under reduced pressure, may be the aqueous fire-retardant composition according to the present disclosure. In one embodiment, the dispersing polymer provided in a) is a polyacrylate and the emulsion obtained in c), optionally after removal of at least part of the organic solvent, is the aqueous fire-retardant composition according to the present disclosure.

In another embodiment, the dispersing polymer provided in a) comprises free isocyanate groups and the process to obtain the aqueous fire retardant composition comprises a further step d) wherein the dispersing polymer in the particles obtained in c) is chain-extended by reacting at least part of its free isocyanate groups with a diamine or triamine. The reaction between free isocyanate groups of the polymer and amine groups of the di- or triamine results in urea bonds and in a higher molecular weight of the polymer with ionic dispersing groups. In this embodiment, the dispersing polymer provided in a) preferably is a polyurethane or polyurethane-urea hybrid, more preferably a polyurethane. The chain-extended organic polymer obtained in step d) preferably is a polyurethane-urea hybrid.

It has been found that a polyurethane-urea hybrid obtainable by chain extension of a polyurethane or polyurethane-urea hybrid with free isocyanate groups is particularly suitable to be used as the organic polymer with ionic dispersing groups in the fire-retardant composition according to the present disclosure. It has been found that if a fire-retardant composition comprising such chain-extended polymer is used in a coating composition, a coating film with very good mechanical properties and chemical resistance is obtained.

Reference herein to free isocyanate groups is to isocyanate groups that have unblocked isocyanate functionality.

The content of free isocyanate groups in the dispersing polymer provided in a) is preferably in the range of from 2 to 12 wt %, more preferably of from 3 to 10 wt %, based on the solid weight of the polymer. The isocyanate content can suitably be determined in accordance with DIN EN ISO 11909, by reacting the polymer with excess dibutylamine and back-titrating with hydrochloric acid against bromophenol blue.

Preferably, the dispersing polymer with free isocyanate groups is reacted with the diamine or triamine using a substoichiometric amount of reactive amine groups, to avoid the presence of unreacted amine. Preferably, the di- or triamine is added in such amount that the number of reactive amine groups is equivalent to in the range of from 50 to 90% of the free isocyanate groups, more preferably of from 60 to 80%. The chain-extended polymer obtained in step d) thus may comprise some free isocyanate groups, for example up to 3 wt %, more preferably up to 2.5 wt %. Such free isocyanate groups will react with water to form additional urea groups and carbon dioxide. Suitable diamines or triamines for chain-extending isocyanate-functional polymers are well-known in the art. The diamines may have two or three primary and/or secondary amine groups that are reactive with the free isocyanate groups in the dispersing polymer. Preferably, the diamine or triamine is an aliphatic diamine or triamine, more preferably an aliphatic diamine or triamine with two primary amine groups. The diamine preferably has up to 16 carbon atoms, more preferably in the range of from 2 to 12 carbon atoms. Particularly preferred amines are ethylene diamine, isophorone diamine, and diethylene triamine.

The organic dispersing polymer provided in a) preferably is a polyurethane or polyurethane-urea hybrid obtainable by condensation polymerization of one or more monomers with at least two isocyanate-reactive functional groups with a poly-isocyanate, wherein the one or more monomers with at least two isocyanate-reactive functional groups comprise a polyol or polyamine with an ionic dispersing group and a polycarbonate diol or a polyester diol, preferably a polycarbonate diol.

The dispersing polymer provided in a) and present during emulsification step c) preferably has a number average molecular weight in the range of from 500 to 6,000 g/mole, more preferably of from 1,000 to 4,000 g/mole. If the dispersing polymer is chain extended in step d) to obtain the final organic polymer with ionic dispersing groups, the final organic polymer preferably has a number average molecular weight of at least 10,000 g/mol, more preferably in the range of from 20,000 to 10,000,000 g/mole, even more preferably in the range of from 50,000 to 1,000,000 g/mole.

The aqueous phase of the fire-retardant composition comprises water as the main liquid, preferably at least 50%, more preferably at least 70 wt %, even more preferably at least 80 wt % of the aqueous phase is water. The aqueous phase may comprise up to 95 wt %, or even up to 100 wt % of water. It will be appreciated that part of the organic solvent used in the preparation of the fire-retardant composition may be present in the aqueous phase, in particular in case such organic solvent is an oxygenated organic solvent that is miscible with water.

At least part of the organic solvent may be removed, for example by distillation under reduced pressure, after step c) or d).

The weight ratio of fire-retardant brominated epoxy polymer to organic polymer in the dispersed particles may be any suitable ratio. The desired ratio will depend on the final application of the fire-retardant composition. If the fire-retardant composition is to be applied in a coating composition that needs a large amount of fire retardant in order to meet fire-retardant requirements, a higher ratio is desired. It has been found that sub-micron dispersed particles can be obtained with ratios of brominated epoxy polymer to organic polymer with ionic dispersing groups of up to 80:20, depending on the organic polymer used.

Preferably the weight ratio of fire-retardant brominated epoxy polymer to organic polymer in the dispersed particles ratio is in the range of from 5:95 to 80:20, more preferably of from 10:90 to 78:22.

The aqueous fire-retardant composition may have any suitable solids content, preferably in the range of from 10 to 60 wt %, more preferably of from 20 to 55 wt %. Reference herein to solids content is to solids content as determined in accordance with ISO 3251 with an initial sample mass of 1.0 g, test duration of 60 minutes, at a temperature of 125° C.

The aqueous fire-retardant composition according to the invention can suitably be used in an aqueous fire-retardant coating composition. The fire-retardant composition is particularly suitable for coating compositions for decorative coatings, since the sub-micron size of the dispersed fire-retardant polymer results in coatings with very good aesthetic properties, in particular gloss.

Therefore, the invention relates in a second aspect to an aqueous fire-retardant coating composition comprising the aqueous fire-retardant composition.

The coating composition may be any type of aqueous coating composition that requires a fire retardant.

The organic polymer with ionic dispersing groups may serve as a film-forming binder polymer in the coating composition. Preferably, the coating composition comprises one or more further film-forming polymers. Reference herein to further film-forming polymers is to film-forming polymers in addition to the organic polymer with ionic dispersing groups comprised in the fire-retardant composition. Reference herein to film-forming polymer (also referred to as binder polymer or resin) is to a polymer that film-forms, i.e. forms a coating film when applied to a surface and is then dried and/or cured.

The coating composition is an aqueous coating composition. The particles of the fire-retardant composition and any further film-forming polymers are dissolved or dispersed in an aqueous phase, preferably dispersed. The aqueous phase comprises water as the main liquid, preferably more than 50%, more preferably more than 70 wt %, even more preferably more than 80 wt % of the aqueous phase is water. The aqueous phase may comprise up to 95 wt %, or even up to 100 wt % of water.

Examples of suitable further film-forming polymers include polyacrylates, alkyds, polyesters, polyurethanes, polyureas, polyethers and hybrids of two or more thereof. Such film-forming polymers are well known in the art.

The coating composition may comprise the one or more further film-forming polymers in any suitable amount, preferably in the range of from 10 to 80 wt % of polymer solids based on the total weight of the coating composition, more preferably of from 15 to 70 wt %, even more preferably of from 20 to 50 wt %.

If the one or more further film-forming polymers comprise a polymer with crosslinking functionality, the coating composition may comprise a crosslinking agent. Such coating composition may be a one-component system wherein all reactive components are present in the same component and storage stable. Alternatively, such coating composition may be a two-component system comprising a first component comprising the polymer with crosslinking functionality and a second component comprising the crosslinking agent.

If the one or more further film-forming polymers comprise an oxidatively drying polymer, such as for example an alkyd resin, a fatty acid modified polyacrylate, or other unsaturated film-forming polymer, the coating composition preferably further comprises a drier (siccative).

The organic polymer with ionic dispersing groups in the fire-retardant composition preferably is a film-forming polymer that can act as binder polymer in the coating composition and will become part of the dried or cured coating, resulting in improved film properties.

The coating composition may comprise one or more further fire retardants, such as for example ammonium polyphosphate (APP), preferably encapsulated APP, silicone-containing fire retardants such as polyorganosilsesquioxane (a compound of general chemical formula $(RSiO_{3/2})_n$ wherein R is a H atom or an alkyl, aryl, or alkoxyl radical), aluminum trihydrate or magnesium hydroxide. If the one or more further fire retardants comprise APP, it is preferably encapsulated APP for example in a layer of melamine-formaldehyde (commercially available as Exolit® AP 462 from Clariant). The coating composition may comprise additional brominated epoxy polymer as further fire retardant, i.e. in addition to the brominated epoxy polymer incorporated in the fire-retardant composition according to the first aspect of the invention. Such additional brominated epoxy polymer will typically have a larger particle size than the brominated epoxy polymer in the fire-retardant composition according to the first aspect of the invention. To control gloss level of the coating, the amount of additional brominated epoxy polymer is preferably less than 50 wt %, more preferably less than 20 wt %, based on the total weight of brominated epoxy polymer.

In one embodiment, the coating composition comprises APP and polyorganosilsesquioxane as further fire retardants.

The amount of fire-retardant brominated epoxy polymer in the coating composition may be any suitable amount. It will be appreciated that the desired amount of fire-retardant polymer will depend on the type of coating composition and its application. In a coating composition for aircraft interior components for example, the amount of fire-retardant brominated epoxy polymer is typically in the range of from 1 to 30 wt %, preferably of from 3 to 25 wt % (solids on total weight).

The coating composition may comprise further ingredients commonly used in coating compositions such as color and effect pigments, extender pigments, coalescing solvents, and one or more additives such as for example surfactants, defoaming agents, rheology modifiers, thickeners, leveling agents, and biocides.

If the coating composition comprises APP as further fire retardant it is preferred that the coating composition contains microfibrillated cellulose as rheology modifier. Microfibrillated cellulose is commercially available, for example as Exilva Forte 10. Microfibrillated cellulose is preferably present in an amount in the range of from 0.1 to 20 wt %, more preferably of from 0.5 to 10 wt % based on the total weight of the coating composition.

The solids content of the coating composition is preferably in the range 10 to 85 wt %, more preferably of from 15 to 80 wt %, even more preferably of from 20 to 75 wt %, still more preferably of from 40 to 70 wt %.

The coating composition is preferably formulated as a one-component (1K) coating composition. This means that all ingredients of the coating composition are stored in the same container after manufacture and have a reasonable shelf life in this state.

The coating composition can be used to apply a single coating directly to a substrate, or in a multilayer system, in particular as a topcoat applied to a primer coat. An important advantage of the present coating composition is that can be applied in thin layers (<200 μm), while having high performance as regulated in the standard test FAR 25.853 and ABD 0031. The thickness of the coating obtained from the coating composition according to the present disclosure is preferably less than 200 μm, more preferably in the range from 20 to 100 μm.

The coating composition can further be formulated with any gloss grade, such as low or semi-gloss. The coating composition may be a clear coat or may be tinted in any color, with no effect on other performance properties such as fire retardant ability, heat retardant ability, water resistance.

In a particularly preferred embodiment, the one or more further film-forming polymers in the coating composition comprise a dispersed polyacrylate having a glass transition temperature $T_g$ of at least 45° C. and a dispersed polyurethane based on a polycarbonate polyol. This coating composition has been found to be particularly suitable for aircraft interior applications, more in particular on a composite substrate.

The polyacrylate has a glass transition temperature $T_g$ of at least 45° C., preferably at least 50° C., more preferably in the range of from 55 to 90° C. Without wishing to be bound by any theory, the relatively high $T_g$ of the polyacrylate is believed to contribute to good stain resistance of the resulting coating.

Reference herein to the glass transition temperature $T_g$ is to the glass transition temperature as determined by modulated differential scanning calorimetry (MDSC) using an amplitude of modulation of 1° C., a period of modulation of 40 seconds, and an underlying heating range of 5° C./min. Helium is used as purge gas at a flow of 50 ml/min. Two runs are performed; the second one directly after the first one and the glass transition temperature $T_g$ is the value determined in the second run.

The polyacrylate preferably has both a number-average molecular weight $M_n$ and a weight-average $M_w$ molecular weight of at least 100,000 g/mol, more preferably in the range 500,000-5,000,000 g/mol. The high molecular weight makes it possible to formulate the coating composition as a one component composition without the need for a crosslinker.

The polyacrylate preferably has some acid functionality, i.e. is prepared from a monomer mixture containing an acid-functional comonomer such as acrylic acid or methacrylic acid, in order to provide dispersibility in water. More preferably the polyacrylate has an acid number in the range of from 1 to 20 mg KOH/g polymer, even more preferably of from 1 to 10 mg KOH/g polymer, still more preferably of from 1 to 7 mg KOH/g polymer.

The polyacrylate preferably has a hydroxyl number of less than 5 mg KOH/g polymer. In some embodiments, the (meth)acrylate polymer has no OH functionality and has a hydroxyl number of 0 mg KOH/g polymer. The hydroxyl number can be measured according to ISO 4629-2.

Suitable polyacrylates are commercially available as dispersions in water. Examples of such dispersions (also referred to as emulsions) include Setaqua® 6770, Setaqua® 6756, Setaqua® 6766 from Allnex, Bayhydrol® A2427 from Covestro, Ottopol® KX-99 from Gellner Industrial, LLC, Joncryl® 540, Joncryl® 1532, Joncryl® 1982 from BASF, Picassian® AC-122, Picassian® AC-126, Picassian® AC-169, Picassian® AC-176 from Stahl.

The polyacrylate preferably has crosslinking functionality, more preferably self-crosslinking functionality. Commercial polyacrylate emulsions with self-crosslinking functionality are for example Setaqua® 6766, Setaqua® 6770, both from Allnex, Picassian® AC-122, Picassian® AC-169 from Stahl.

The polyacrylate is preferably present in an amount in the range of from 5 to 50 wt %, more preferably of from 8 to 40 wt %, of the total weight of the coating composition. The polyacrylate is preferably present in an amount of from 30 to 85 wt %, more preferably of from 50 to 80 wt %, of the total weight of the one or more further film-forming polymers.

The polyurethane based on polycarbonatediol preferably has a number-average molecular weight $M_n$ in the range of from 2,000 to 100,000 g/mol, more preferably of from 5,000 to 50,000 g/mole. The polyurethane preferably has a weight-average molecular weight $M_w$ in the range of from 5,000 to 100,000 g/mol, more preferably of from 10,000 to 50,000 g/mol.

Preferably, the polyurethane contains acid functionality to aid dispersibility in water. The polyurethane preferably has an acid number in the range of from 1 to 30 mg KOH/g polymer, more preferably of from 1 to 25 mg KOH/g polymer.

The polyurethane may have hydroxyl functionality. In some embodiments, the polyurethane has low no hydroxyl functionality and has an hydroxyl number of 0 mg KOH/g polymer. In other embodiments the polyurethane has hydroxyl functionality and may have any suitable hydroxyl number, preferably in the range of from 1 to 120 mg KOH/g polymer, more preferably of from 1 to 100 mg KOH/g polymer.

Suitable polyurethanes are commercially available as dispersions in water. Examples of such dispersions (also referred to as emulsions) include Picassian® PU461, PU676, Relca PU 655, all from Stahl, Bayhydrol® UH 2557, Bayhydrol® UH 2593/1, both from Covestro, SILIKOPUR® 8081 from Evonik, Hauthane L-2897 from Hauthaway.

The polyurethane is preferably present in the coating composition in an amount in the range of from 1 to 50 wt %, more preferably of from 3 to 40 wt %, of the total weight of the coating composition. The polyurethane is preferably present in an amount of from 15 to 70 wt %, more preferably of from 20 to 50 wt %, of the total weight of the one or more further film-forming polymers.

The weight ratio of the polyacrylate to the polyurethane is preferably in the range 1:5 to 5:1, more preferably in the range from 1:1 to 4:1, based on the solids weight of the polymers.

In a final aspect, the invention relates to a substrate coated with a coating deposited from a coating composition according to the invention. The substrate may be any suitable substrate, such as for example wood, polymer, composite, metal or mineral substrate. The substrate may be a bare substrate on which the coating composition may be used as a primer or as a pore filler, or an already primed substrate on which the coating composition may be used as a topcoat.

The coating composition can suitably be applied to substrates typically used for interior applications of airplanes, trains, or other vehicles. The substrate is preferably selected from the group consisting of plastic, composite, and metal substrates. Particularly preferred substrates are plastic substrates such as polycarbonate, polyetherimide (PEI), polyether ether ketone (PEEK), and polyphenylsulfone (PPSU) substrates, composite substrates such as honeycomb composites and laminates (e.g. polyvinylfluoride laminates), and pre-treated metal (e.g. chromated aluminum). An example of a honeycomb composite is NOMEX® aramid paper from DuPont widely used in aircraft structural panels because of its high strength to weight ratio and resistance to fatigue failures.

The coating composition is particularly useful for aircraft interior applications.

The invention is further illustrated by means of the following non-limiting examples.

EXAMPLES

Example 1—Preparation of Aqueous Fire-Retardant Composition 1 (Invention)

A dispersing polyurethane in di(propylene glycol)dimethyl ether was prepared by reacting polycarbonatediol (Eternacoll UM-90; OH number 125 mg KOH/g), dimethylol propionic acid, and poly(ethylene glycol) 600 with isophorone diisocyanate and 4,4'-methylene dicyclohexyl diisocyanate in di(propylene glycol)dimethyl ether as solvent in a 1.0 L double walled reactor (under a nitrogen blanket, stirring at 200 rpm) at 100° C. for 4 hours. The resulting dispersing polyurethane had a number average molecular weight of 1,200 g/mole, a free isocyanate content of 7 wt %, an ethylene oxide content of 1 wt % and an acid number of 29 mg KOH/g polymer (determined according to ISO 2114).

The thus-prepared dispersing polyurethane in di(propylene glycol)dimethyl ether was cooled to 40° C. and combined with a 70 wt % solution of bromated epoxy polymer (TexFRon 4002) in di(propylene glycol)dimethyl ether such that a solids weight ratio of bromated epoxy polymer to dispersing polyurethane of 75/25 was obtained. The solids content of the polymer blend was reduced to 69% by adding further di(propylene glycol)dimethyl ether.

All acidic carboxyl groups of the polyurethane were neutralized with triethylamine. The neutralized solution was then emulsified at 40° C. in 15 minutes by adding water whilst stirring at 600 rpm. To chain extend the polyurethane, a 33% (wt/wt) solution of ethylenediamine in water was dropwise added over 60 seconds. The resulting emulsion was then filtered over an 80 μm nylon filter. The chain extended polyurethane-urea hybrid thus-obtained had a free isocyanate content of 2.4 wt %.

The resulting fire-retardant composition comprised 50 wt % solids, a weight ratio of fire-retardant polymer to polyurethane-urea hybrid of 75/25, and dispersed particles with a volume average diameter D [4:3] as determined by laser diffraction of 128 nm.

Example 2—Preparation of Aqueous Fire-Retardant Compositions 2 to 5 (Invention)

Aqueous fire-retardant compositions were prepared as described in EXAMPLE 1, except that the weight ratio of fire-retardant polymer (FR) to dispersing polyurethane was varied. The volume average diameter D [4:3] of the particles in the resulting fire-retardant compositions was determined as described in EXAMPLE 1. The results are shown in Table 1.

Example 3—Preparation of Aqueous Fire-Retardant Composition 6 with Polyacrylate (Invention)

To 58 grams methyl amyl ketone that was kept in a 1.0 L round bottom flask at 145° C. under a nitrogen blanket was slowly added 102 grams isobornylmethacrylate (IBOMA), 67 grams 2-hydroxyethylmethacrylate (HEMA), 19 grams neononanoic acid ethenyl ester (VEOVA 9), 5 grams acrylic acid, 5 grams methacrylic acid, and 10 grams tert-butyl peroxy-3,5,5-trimethylhexanoate (Trigonox 42S). Addition took place over 90 minutes under continuous stirring. After addition was complete, the reaction mixture was cooled to 125° C. and a further 1 gram of Trigonox 42S dissolved in 7 grams methyl amyl ketone was added in 10 minutes and the reaction was continued for 60 minutes at 125° C.

A solution of polyacrylate with pendant dispersing groups in methyl amyl ketone was thus obtained. The polyacrylate had a number average molecular weight of 3,550 g/mole, and an acid number of 33 mg KOH/g polymer, determined according to ISO 2114.

The thus-prepared polyacrylate in methyl amyl ketone was cooled to 80° C., 12 gram triethylamine was added and the resulting neutralized polyacrylate solution was blended with 33 grams of a 70 wt % solution of bromated epoxy polymer (TexFRon 4002) in di(propylene glycol)dimethyl ether.

The polymer blend was then emulsified by adding 750 grams water whilst stirring at 600 rpm at 80° C. for 30 minutes. The resulting emulsion was then cooled to 30° C. and filtered over an 80 μm nylon filter.

The resulting fire-retardant composition comprised 22 wt % solids, a weight ratio of fire-retardant polymer to polyacrylate of 10:90, and dispersed particles with a volume average diameter D [4:3] as determined by laser diffraction of 110 nm.

Example 4—Preparation of Aqueous Fire-Retardant Compositions 7 and 8 (Invention)

Aqueous fire-retardant compositions were prepared as described in EXAMPLE 3, except that the weight ratio of fire-retardant polymer to polyacrylate was varied. The volume average diameter D [4:3] of the particles in the resulting fire-retardant compositions was determined as described in EXAMPLE 3. The results are shown in Table 1.

TABLE 1

| | Fire retardant compositions | | |
|---|---|---|---|
| composition | organic polymer with ionic dispersing groups | ratio FR/organic polymer (wt/wt) | D [4:3] (nm) |
| 1 | polyurethane-urea hybrid | 75/25 | 128 |
| 2 | polyurethane-urea hybrid | 70/30 | 117 |
| 3 | polyurethane-urea hybrid | 60/40 | 106 |
| 4 | polyurethane-urea hybrid | 40/60 | 74 |
| 5 | polyurethane-urea hybrid | 10/90 | 77 |
| 6 | polyacrylate | 10/90 | 110 |
| 7 | polyacrylate | 20/80 | 160 |
| 8 | polyacrylate | 30/70 | 500 |

Example 5—Coating Compositions with FR Composition (Invention)

Coating compositions according to the invention were prepared by mixing 37.4 grams of fire-retardant composition 1 prepared as described in EXAMPLE 1 with 100 grams of an aqueous white or black toner composition. The ingredients of the aqueous toner compositions used are given in Table 2. The resulting coating compositions are indicated as compositions 5 (white) and 5 (black).

Example 6—Coating Compositions with TexFRon 4002 as Supplied (Comparison)

A comparison aqueous dispersion comprising:
- 30.6 wt % aqueous polyacrylate emulsion (Setaqua 6766; 40% solids)
- 15.0 wt % aqueous polyurethane dispersion (Picassian PU 461; 35% solids)
- 0.09 wt % ammonia
- 4.3 wt % solvent (2.6 wt % propoxy-propanol and 1.7 wt % 1-(2-butoxy-1-methylethoxy)propan-2-ol)
- 0.05 wt % defoaming agents
- 50 wt % bromated epoxy polymer (TexFRon 4002)

was prepared by adding solid bromated epoxy polymer to the other ingredients in a dissolver mixer and mixing for 20 minutes at 2,000 rpm.

Comparison coating compositions were prepared by adding 37.4 grams of the aqueous dispersion comprising bromated epoxy polymer to 100 grams of a white or black toner composition of Table 2. The resulting coating compositions are indicated as compositions 6 (white) and 6 (black).

TABLE 2

Toner compositions

|  | White toner | Black toner |
|---|---|---|
| Aqueous polyacrylate emulsion (40% solids)[a] | 34 | 32 |
| Aqueous polyurethane dispersion (35% solids)[b] | 17 | 16 |
| Ammonia (25 wt % solution) | 0.44 | 0.42 |
| Defoaming agents | 0.41 | 0.40 |
| Solvent[c] | 4.7 | 4.5 |
| Dispersant | 0.22 | 0.20 |
| Titanium dioxide | 23 | 21 |
| Carbon black | — | 5.7 |
| Microfibrillated cellulose | 1.8 | 1.8 |
| Polymethylsilsesquioxane | 9.3 | 9.3 |
| Encapsulated APP | 2.5 | 2.5 |
| Water | 2.2 | 2.2 |
| Polyethylene wax dispersion | 4.6 | 4.6 |

[a]Setaqua 6766: Self-crosslinking styrene-acrylic emulsion from Allnex (40 wt. % solids, crosslinking agent adipic dihydrazide (ADH), MFFT 50° C., $T_g$ 65° C., $M_n$ and $M_w$ estimated higher than 1,000,000 g/mol, acid number 4.4 mg KOH/g resin)
[b]Picassian PU 461: a polycarbonate diol based polyurethane dispersion from Stahl (35 wt. % solids, 14 wt. % solvents, $T_g$ 65° C., $M_n$ 7,380 g/mol, $M_w$ 37,700 g/mol)
[c]propoxy-propanol and 1-(2-butoxy-1-methylethoxy)propan-2-ol

Example 7—Gloss

The coating compositions prepared in EXAMPLES 5 and 6 were manually applied on a Lenata opacity chart using a screw-bar draw-down applicator (S=0.5 mils) at a wet film thickness of 150 μm and allowed to dry at 23° C. and 50% relative humidity. After one day the dried coatings were tested for gloss. Gloss at 60° angle was determined using a tri-gloss Byk Gardner gloss meter. Low gloss is defined as having in the range 8-12 gloss units at 60° angle; semi-gloss as having in the range 12-30 gloss units at 60°.

TABLE 3

Gloss at 60°

| Coating composition | particle size fire retardant | gloss at 60° (gloss units) |
|---|---|---|
| 5 (white)-invention | 128 nm | 25 |
| 5 (black)-invention | 128 nm | 23 |
| 6 (white)-comparison | 3.1 μm | 9 |
| 6 (black)-comparison | 3.1 μm | 6 |

Example 8—Properties of Sprayed Coatings

Diluted coating compositions were prepared for spraying by adding 10 weight parts of water to the coating compositions prepared in EXAMPLES 5 (invention) and 6 (comparison). The diluted compositions were then sprayed using a DeVilbiss GTi PRO spray gun at 2 bar and 16 mm nozzle width on a polycarbonate substrate (Lexan 9604 sheet). The coatings were allowed to dry at 23° C. and 50% relative humidity.

After 1 day, gloss at 60° angle was determined using a tri-gloss Byk Gardner gloss meter.

After 2 days of drying, stain resistance was determined by applying mustard and coffee stains on the dried coating and cleaning the coating after two hours with a mixture of water and Turco 5948-DPM aircraft cleaner (ex. Henkel) in a 20:1 wt/wt ratio. The staining was rated on a scale of 0-5, with 0 indicating no staining and 5 indicating severe staining.

Adhesion to the substrate was determined after 1 day of drying (dry adhesion) and after two days of drying and one day immersion in water (wet adhesion). Adhesion was determined in a cross-hatch test according to ISO 2409 using 6 scratching tips at a distance of 2 mm. Adhesion was classified from 0 (excellent adhesion) to 5 (very poor adhesion) as follows:

| 0 | 0% of coating area removed |
|---|---|
| 1 | at most 5% of coating area removed |
| 2 | 5-15% of coating area removed |
| 3 | 15-35% of coating area removed |
| 4 | 15-35% of coating area removed |
| 5 | more than 65% of coating area removed |

In Table 4, the dry film thickness of the applied coatings (after one day drying), 60° gloss, stain resistance, and dry and wet adhesion are given.

TABLE 4

Coating properties: gloss, stain resistance, and adhesion

| Coating composition | DFT (μm) | gloss 60° (g. u.) | stain resistance mustard | stain resistance coffee | adhesion dry | adhesion wet |
|---|---|---|---|---|---|---|
| 5 (white)-invention | 20 | 22 | 0 | 2 | 0 | 0 |
| 5 (black)-invention | 22 | 19 | 0 | 0 | 0 | 0 |
| 6 (white)-comparison | 30 | 8 | 0 | 4 | 0 | 2 |
| 6 (black)-comparison | 31 | 5 | 0 | 0 | 0 | 2 |

Example 9—Heat Release Rate

The coating compositions prepared as described in EXAMPLE 8 were spray applied as described in EXAMPLE 8 at high film build on a resin impregnated laminate commonly used in aerospace interiors (Type 12 laminate as described in AIMS-04-08-000) and on an aluminum substrate (aluminum 2024-T3, bare, 0.5 mm).

The heat release was tested using OSU burn equipment. The peak heat release rate (PHHR) and the total amount of heat released (THR) are shown in Table 5.

TABLE 5

Results of OSU heat release testing

| Coating composition | substrate | film weight (g)* | PHRR (kW/m$^2$) | THR (kW-min/m$^2$) |
|---|---|---|---|---|
| 5 black (inv.) | composite | 2.81 | 52.1 | 28.9 |
| 6 black (comp.) | composite | 2.78 | 51.3 | 28.3 |
| 5 black (inv.) | aluminium | 2.26 | 28.5 | 12.8 |
| 6 black (comp.) | aluminium | 2.29 | 28.3 | 11.2 |

*on a panel of 15.24 cm × 15.24 cm (6 × 6 inch)

The results show that heat release for the coating compositions according to the invention is comparable to heat release of comparison coating compositions with the same amount of fire retardant based on the solid weight of the further film-forming polymers.

The invention claimed is:

1. An aqueous fire-retardant composition comprising particles dispersed in an aqueous phase, wherein the particles comprise:
   a fire-retardant brominated epoxy polymer; and
   an organic polymer comprising ionic dispersing groups,
   wherein the particles comprising the fire-retardant polymer and the organic polymer comprising ionic dispersing groups have a volume average diameter D [4:3] as determined by laser diffraction in the range of from 100 to 200 nm,
wherein the organic polymer comprising ionic dispersing groups is a polyurethane or a polyurethane-urea hybrid, and wherein the weight ratio of fire-retardant brominated epoxy polymer and organic polymer comprising ionic dispersing groups in the particles is in the range of from 60:40 to 80:20.

2. The aqueous fire-retardant composition according to claim 1, wherein the brominated epoxy polymer is a tribromophenol end-capped bromated epoxy polymer.

3. The aqueous fire-retardant composition according to claim 1, wherein the organic polymer comprising ionic dispersing groups is a film-forming polymer.

4. The aqueous fire-retardant composition according to claim 1, wherein the organic polymer comprising ionic dispersing groups is a polyurethane-urea hybrid.

5. The aqueous fire-retardant composition according to claim 1, obtained by a process comprising:
   a) providing a solution of the fire-retardant polymer and an organic dispersing polymer comprising ionic dispersing groups in organic solvent;
   b) neutralizing at least part of the ionic dispersing groups to obtain a neutralized solution of the fire-retardant polymer and the dispersing polymer; and
   c) emulsifying the neutralized solution obtained in b) in water to obtain particles comprising the fire-retardant polymer and the dispersing polymer dispersed in an aqueous phase,
wherein the organic dispersing polymer is a polyurethane or polyurethane-urea hybrid, and wherein the organic solvent is an oxygenated organic solvent.

6. The aqueous fire-retardant composition according to claim 5, wherein the dispersing polymer provided in a) comprises terminal free isocyanate groups, and wherein the process further comprises:
   d) chain extending the dispersing polymer comprising terminal free isocyanate groups in the particles obtained in c) by reacting at least part of the terminal free isocyanate groups with a diamine or triamine.

7. The aqueous fire-retardant composition according to claim 5, wherein the organic dispersing polymer is a polyurethane or polyurethane-urea hybrid obtained by condensation polymerization of one or more monomers with at least two isocyanate-reactive functional groups with a poly-isocyanate, wherein the one or more monomers with at least two isocyanate-reactive functional groups comprise a polyol or polyamine with an ionic dispersing group and a polycarbonate diol or a polyester diol.

8. The aqueous fire-retardant composition according to claim 1, wherein the ionic dispersing groups are carboxyl groups, sulphonate groups or phosphonate groups.

9. An aqueous fire-retardant coating composition comprising the aqueous fire-retardant composition according to claim 1.

10. The aqueous fire-retardant coating composition according to claim 9 further comprising one or more further film-forming polymers.

11. The aqueous fire-retardant coating composition according to claim 10, wherein the one or more further film-forming polymers comprise:
   a dispersed (meth)acrylate polymer, wherein the glass transition temperature of the (meth)acrylate polymer is at least 45° C. as determined by modulated differential scanning calorimetry using an amplitude of modulation of 1° C., a period of modulation of 40 seconds, and an underlying heating range of 5° C./min; and
   a dispersed polyurethane based on a polycarbonate polyol.

12. A substrate coated with a coating deposited from the aqueous fire-retardant coating composition according to claim 10.

13. The aqueous fire-retardant composition of claim 7, wherein the one or more monomers with at least two isocyanate-reactive functional groups comprise a polyol or polyamine with an ionic dispersing group and a polycarbonate diol.

14. The aqueous fire-retardant composition according to claim 5, wherein the oxygenated organic solvent comprises a polyalkyleneglycol dialkylether.

* * * * *